W. McKEWEN.
VEHICLE TOP.
APPLICATION FILED MAY 24, 1918.
1,286,692.
Patented Dec. 3, 1918.
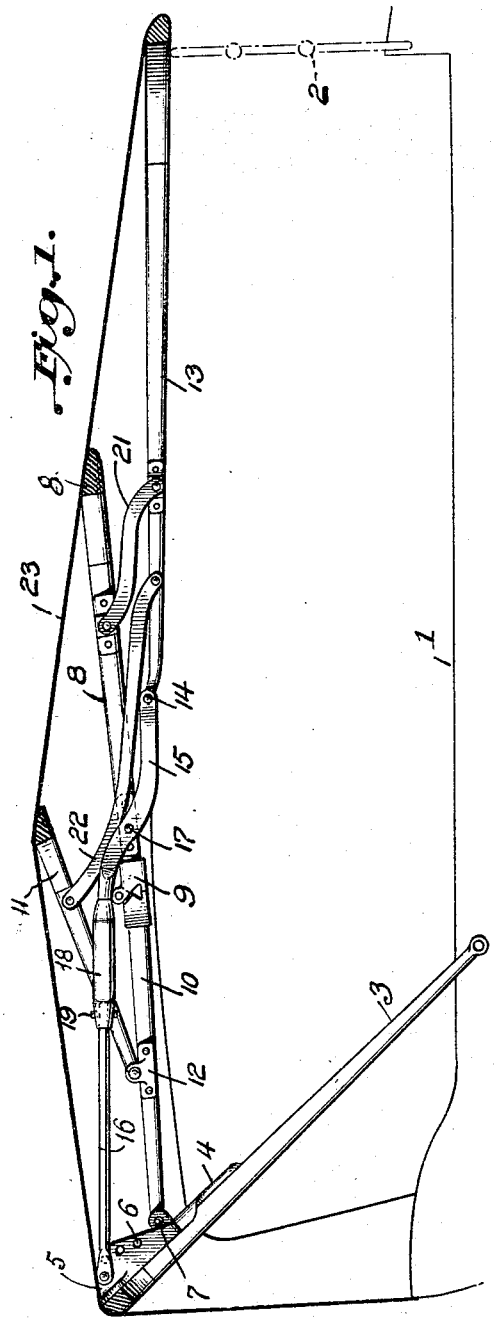
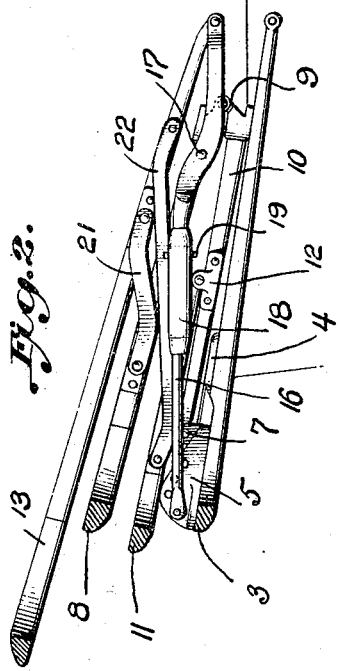
Watson McKewen, Inventor

UNITED STATES PATENT OFFICE.

WATSON McKEWEN, OF FLINT, MICHIGAN.

VEHICLE-TOP.

1,286,692.   Specification of Letters Patent.   Patented Dec. 3, 1918.

Application filed May 24, 1918. Serial No. 236,258.

*To all whom it may concern:*

Be it known that I, WATSON McKEWEN, a citizen of the United States of America, residing at Flint, in the county of Genesee and State of Michigan, have invented certain new and useful Improvements in Vehicle-Tops, of which the following is a specification, reference being had therein to the accompanying drawings.

This invention relates to vehicle tops, and the primary object of my invention is to provide a top framework which may be supported by a single rearwardly extending bow and the wind-shield frame of an automobile body, without using additional body bows that may tend to obstruct or interfere with the view of passengers in the automobile, besides lending weight to the same and requiring considerable labor when the top is to be raised or lowered.

Another object of my invention is to provide a vehicle top framework including a rearwardly extending bow, supplemental, intermediate and outrigger bows connected by links and arms in a manner as to provide a rigid framework when the top is set up and a compact framework when the top is folded or collapsed, in either instance the framework being for such construction as to prevent the canopy or cover thereof from being cut or unnecessarily worn when the top is manipulated.

A further object of my invention is to accomplish the above and other results by a simple and durable mechanical construction that will be hereinafter specifically described and then claimed, and reference will now be had to the drawing, wherein—

Figure 1 is a longitudinal sectional view of the top framework, showing the inner side thereof in elevation; and the framework extended or raised;

Fig. 2 is a similar view showing the framework collapsed or folded, and

Fig. 3 is a detail sectional view of the telescopic arm adapted to form part of the framework.

In the drawing, the reference numeral 1 denotes a portion of an automobile body having a windshield 2 and a rearwardly extending bow 3, said bow being of a conventional form adapted to be lowered about the rear seat of the automobile body.

On the rearwardly extending bow 3, adjacent the top thereof, are two pieces of hardware 4, and as each side of the framework is identical in construction, I deem it only necessary to consider one side of the framework, as shown in Figs. 1 and 2.

The piece of hardware 4 may be in the form of a sleeve or fitting suitably secured to the rearwardly extending bow 3 and provided with an apertured lug 7 and a flange 5 having a series of apertures 6.

Pivotally connected to the apertured lug 7 is an intermediate break-down bow 8, said intermediate bow having rule or break-down joints 9, so that the rear ends of the bow may be swung downwardly substantially in parallelism with the rearwardly extending bow 3 and the forward end of the bow 8 swung upwardly and rearwardly into parallelism with the ends 10 of said bow.

11 denotes a supplemental bow having the end thereof pivotally connected to a bracket 12, carried by the inner side of the intermediate bow 8, at the end 10 thereof, and as shown in Fig. 2 it is possible to swing the supplemental bow 11 rearwardly between the bow 8 and the end 10 thereof.

13 denotes an outrigger bow adapted to have its forward end connected to the windshield 2, said outrigger bow having each end thereof pivotally connected, as at 14, to a telescopic arm, comprising a compound curved section 15 and a straight tubular section 16. The compound curved section 15 is pivotally connected, as at 17, to the intermediate bow 8 adjacent the rule joint 9, and said section terminates in a tubular slotted socket 18 to receive the tubular section 16. The forward end of the tubular section 16 has a transverse pin 19 slidable in the slots 20 of the socket 18, and the rear end of the tubular section is pivotally connected to the flange 5 at one of the apertures 6 thereof. It is through the medium of the series of apertures 6 that the rear ends of the telescopic arms may be adjusted so that the forward end of the outrigger bow 13 will be properly held relative to the windshield 2.

21 denotes a compound curved link connecting the inner side of the outrigger bow 13 to the inner side of the intermediate bow 8, and 22 denotes a longer link connecting the inner side of the outrigger 13 to the inner side of the supplemental bow 11, these links coöperating in correctly supporting the bows 8 and 11 relative to the bows 13 and 3 so that a canopy or cover 23 may be properly held by the top framework.

The manner in which the various bows are articulated provides a cantaliver structure possessing sufficient rigidity, when set up or extended to insure a safe framework for the canopy or cover 23, and when folding or collapsing the framework, the tubular sections 16 of the telescopic arms slide into the sockets 18 so as to reduce the longitudinal dimension of each of the telescopic arms and thus permit of the framework being compactly assembled at the rear end of the automobile body.

In using the term bows, I desire it to be understood that said bows include sockets, wooden frames, spacers, and such other elements, which when properly proportioned and assembled, will provide a top framework that may be easily manipulated.

One embodiment of my invention has been illustrated, but it is to be understood that the structural elements are susceptible to such variations and modifications as fall within the scope of the appended claims.

What I claim is:—

1. A vehicle top framework, comprising a rearwardly extending bow, an intermediate break-down bow connected thereto, a supplemental bow connected to said intermediate bow, an outrigger bow, links connecting said outrigger bow to said intermediate bow, links connecting said outrigger bow to said supplemental bow, and telescopic arms connecting said outrigger bow to said rearwardly extending bow and said arms pivotally connected to said intermediate bow.

2. A vehicle top framework, comprising a rearwardly extending bow, an intermediate break-down bow pivotally connected to said rearwardly extending bow, an outrigger bow, links connecting said outrigger bow to said intermediate bow, telescopic arms pivotally connected to said intermediate bow and the ends of said outrigger bow, and means connecting said telescopic arms with said rearwardly extending bow so that the forward end of said outrigger bow may be adjusted.

3. In a vehicle top, the combination of a rearwardly extending bow, pieces of hardware carried thereby, an intermediate breakdown bow pivotally connected to said pieces of hardware, an outrigger bow, links pivotally connected to said outrigger bow and to said intermediate bow, telescopic arms pivotally connected to said intermediate bow and to the ends of said outrigger bow, and means connecting said telescopic arms to said pieces of hardware so that the rear ends of said telescopic arms may be adjusted to shift the forward end of said outrigger bow.

In testimony whereof I affix my signature in the presence of two witnesses.

WATSON McKEWEN.

Witnesses:
ERNEST A. PUFFER,
HARRY NOBLE.

Copies of this patent may be obtained for five cents each, by addressing the "Commissioner of Patents, Washington, D. C."